United States Patent [19]

Rinehart

[11] 4,220,579

[45] Sep. 2, 1980

[54] THERMOPLASTIC ELASTOMERIC BLEND OF MONOOLEFIN COPOLYMER RUBBER, AMORPHOUS POLYPROPYLENE RESIN AND CRYSTALLINE POLYOLEFIN RESIN

[75] Inventor: Robert E. Rinehart, Newtown, Conn.

[73] Assignee: Uniroyal, Inc., New York, N.Y.

[21] Appl. No.: 897,066

[22] Filed: Apr. 17, 1978

[51] Int. Cl.$^2$ .............................................. C08L 23/16
[52] U.S. Cl. ............................ 260/33.6 AQ; 526/211; 526/240; 526/88
[58] Field of Search ................... 260/897 A, 33.6 AQ; 526/211, 240

[56] References Cited

U.S. PATENT DOCUMENTS

| | | | |
|---|---|---|---|
| 3,256,367 | 6/1966 | Jayne | 260/897 |
| 3,564,080 | 2/1971 | Pedretti et al. | 260/897 |
| 3,806,558 | 4/1974 | Fischer | 260/897 A |
| 4,072,643 | 2/1978 | Bost | 260/23 H |
| 4,088,714 | 5/1978 | Huff | 260/897 A |

FOREIGN PATENT DOCUMENTS

49-112946 10/1974 Japan .

Primary Examiner—Carman J. Seccuro
Attorney, Agent, or Firm—James J. Long

[57] ABSTRACT

Thermoplastic elastomeric blend of:
 (A) EPM or EPDM type rubber;
 (B) amorphous polypropylene homopolymer or copolymer resin; and
 (C) crystalline polyolefin resin,
characterized by improved processability and physical properties.

9 Claims, 1 Drawing Figure

THERMOPLASTIC ELASTOMERIC BLEND OF MONOOLEFIN COPOLYMER RUBBER, AMORPHOUS POLYPROPYLENE RESIN AND CRYSTALLINE POLYOLEFIN RESIN

This invention relates to a thermoplastic elastomer composition.

Thermoplastic elastomers are materials which can be processed and fabricated by methods used for thermoplastics and do not require any cure in the shaped state to develop elastomeric properties, unlike ordinary elastomers which require cure or vulcanization. Thermoplastic elastomers can be reprocessed since they remain thermoplastic, and therefore scrap and rejects can be recycled, unlike conventional elastomers which are thermoset once they are cured and cannot be reworked. Thermoplastic elastomers therefore combine in an economical manner the processing advantages of a thermoplastic with certain desirable physical properties of a cured elastomer.

Thermoplastic elastomers based on blends of saturated or low unsaturation monoolefin copolymer rubber (EPM or EPDM type rubber) with crystalline polyolefin resin are known. Typically they are made by dynamically partially curing the blend of rubber and resin (see, for example, U.S. Pat. No. 3,806,558, Fischer, Apr. 23, 1974; see also Fischer U.S. Pat. Nos. 3,758,643 issued Sept. 11, 1973, 3,835,201 issued Sept. 10, 1974, and 3,862,106 issued Jan. 21, 1975, and U.S. Pat. No. 4,031,169, Morris, June 21, 1977. Shaped articles having elastomeric properties can be fabricated from the resulting thermoplastic blends without further cure. It has been desired to improve the processing behavior of such thermoplastic elastomers.

U.S. Pat. No. 3,564,080, Pedretti et al, Feb. 16, 1971, discloses extending or diluting vulcanizable EPM or EPDM type rubber compositions with amorphous polypropylene for the purpose of improving the processability; the compositions are vulcanized in the conventional manner to a thermoset, unprocessable state.

U.S. Pat. No. 4,076,669, Harper, Feb. 28, 1978, discloses extending certain hydrogenated SBR rubbery block copolymers with amorphous polypropylene to provide good tensile and flow properties.

In accordance with the present invention, it has now been found that improved thermoplastic elastomers having good processing characteristics and desirable physical properties are obtained by blending:

A. a monoolefin copolymer rubber;
B. an amorphous non-elastomeric polypropylene resin or amorphous non-elastomeric resinous copolymer of propylene with another monoolefin; and
C. a crystalline polyolefin resin;

the said ingredients A, B and C being present in the following proportions, expressed as percent by weight based on the total weight of A, B and C:

15 to 80% of A
5 to 45% of B
15 to 80% of C

Figure 1:
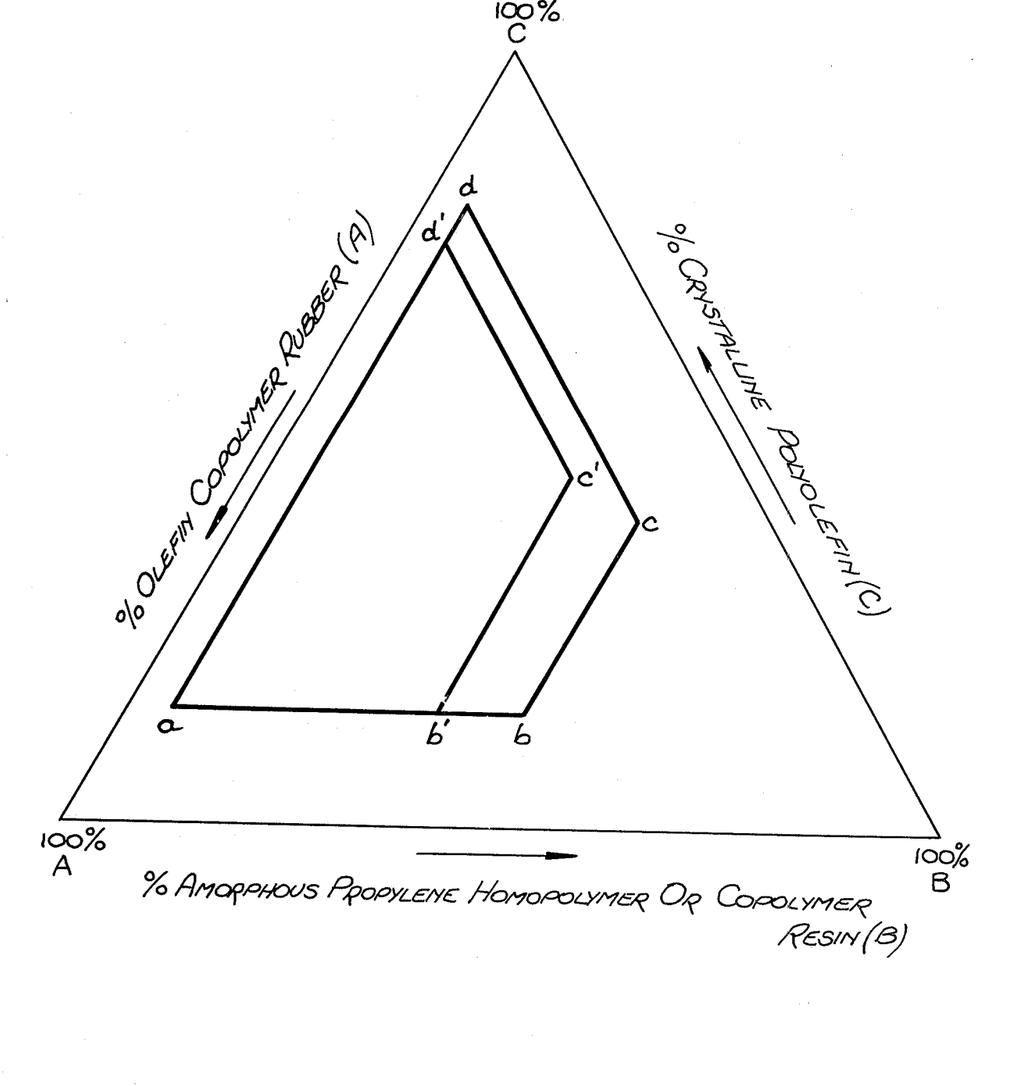

These proportions fall within a trapezoid a b c d having the following triangular coordinates, expressed as weight percent, based on the sum of the weights of A, B and C:

|   | a | b | c | d |
|---|----|----|----|----|
| A | 80 | 40 | 15 | 15 |
| B | 5 | 45 | 45 | 5 |
| C | 15 | 15 | 40 | 80 |

Preferred proportions of A, B and C are:
20 to 50% of A
5 to 35% of B
15 to 75% of C These fall within the trapezoid a b' c' d' represented by the following triangular coordinates:

|   | a | b' | c' | d' |
|---|----|----|----|----|
| A | 80 | 50 | 20 | 20 |
| B | 5 | 35 | 35 | 5 |
| C | 15 | 15 | 45 | 75 |

In the accompanying drawing the single FIGURE is a graph, on triangular coordinates, representing the proportions of the three polymeric ingredients in the compositions of the invention. In the graph, the trapezoid a b c d represents the broad proportions set forth above, while the trapezoid a b'c'd' represents the preferred proportions.

Particularly valuable compositions of the invention further include up to 70 percent by weight, preferably from 5 to 30 percent by weight, of extender oil, based on the sum of the weights of the polymeric components A, B and C.

The blend may be subjected to a dynamic partial curing step as in the above-mentioned Fischer U.S. Pat. No. 3,806,558 but this is not essential.

If a dynamic partial curing step is utilized it may be carried out on the monoolefin copolymer rubber component A above before blending with the other two polymeric components B (the amorphous polypropylene homopolymer or copolymer resin) or C (the crystalline polyolefin resin), or the dynamic curing step may be carried out after mixing the monolefin copolymer rubber component A with some or all of either or both of the two other polymeric components B and C. In any event, it will be noted that the present blend is distinguished from the conventional Fischer-type of thermoplastic elastomer in that component B, the amorphous non-elastomeric polypropylene homopolymer or copolymer resin, is included in the final blend, whether a dynamic curing step is undertaken or not.

The monoolefin copolymer rubber A employed in the blend of the invention is an amorphous, random, elastomeric copolymer of two or more monoolefins, with or without a copolymerizable polyene. Usually two monoolefins are used, but three or more may be used. Ordinarily one of the monoolefins is ethylene while the other is preferably propylene. However, other alphamonoolefins may be used including those of the formula $CH_2=CHR$ where R is an alkyl radical having for example one to 12 carbon atoms (e.g., butene-1, pentene-1, hexene-1, 4-methylpentene-1, 5-methylhexene-1, 4-ethylhexene-1, etc.). While the monoolefin copolymer rubber may be a saturated material, as in ethylene propylene binary copolymer rubber ("EPM"), it is ordinarily preferred to include in the copolymer a small amount of at least one copolymerizable polyene to confer unsaturation on the copolymer ("EPDM"). Although conjugated dienes such as butadiene or isoprene may be used for this purpose (British Pat. No. 983,437, Belgian Pat. No. 736,717, Sumitomo Chemical Co., Jan. 29, 1970), in practice it is usual to employ a non-conjugated diene, including the open-chain non-conjugated diolefins such as 1,4-hexadiene (U.S. Pat. No. 2,933,480 Gresham et al., Apr. 19, 1960) or a cyclic diene, especially a bridged ring cyclic diene, as in dicyclopentadiene (U.S. Pat. No. 3,211,709, Adamek et al., Oct. 12, 1965), or an alkylideneorbornene as in methylenenorbornene or ethylidenenorbornene (U.S. Pat. No. 3,151,173, Nyce, Sept. 29, 1964), as well as cyclooctadeiene, methyltetrahydroindene, etc. (see also such U.S. Pat. Nos. as 3,093,620 and 3,093,621; also 3,538,192 col. 6 line 49 to col. 7, line 51). The polyenes employed are not limited to those having only two double bonds, but include those having three or more double bonds. Typically, conventional monoolefin copolymer rubber has a Brookfield viscosity in excess of 5,000,000 at 375° F., and a Mooney viscosity, of at least 20 ML-4 at 212° F.

The crystalline polyolefin resin C used to make the blend of the invention is a solid, high molecular weight resinous plastic material made by polymerizing such olefins as ethylene, propylene, butene-1, pentene-1, 4-methylpentene, etc., in conventional manner. Thus, such crystalline polyolefins as polyethylene (either of the low density e.g., 0.910–0.925 g/cc, medium density 0.926–0.940 g/cc or high density e.g., 0.941–0.965 type) may be used, whether prepared by high pressure processes or low pressure processes, including linear polyethylene. Polypropylene is a preferred polyolefin plastic, having highly crystalline isotactic and syndiotactic forms. Frequently the density of polypropylene is from 0.800 to 0.980 g/cc. Largely isotactic polypropylene having a density of from 0.900 to 0.910 g/cc may be mentioned particularly. Crystalline block copolymers of ethylene and propylene (which are plastics distinguished from amorphous, random ethylene-propylene elastomers) can also be used. Included among the polyolefin resins are the higher alpha-olefin modified polyethylenes and polypropylenes (see "Polyolefins", N. V. Boenig, Elsevier Publishing Co., N.Y., 1966).

Component B, the amorphous, non-elastomeric polypropylene homopolymer or amorphous, non-elastomeric copolymer of propylene with another monoolefin (e.g., ethylene), is characterized by low degree of isotactic or syndiotactic blocks of said propylene or alpha-olefin copolymer. Unlike crystalline polyolefins such as crystalline polypropylene, such amorphous polymers or copolymers are generally soluble below 100° C. with most aliphatic, aromatic, and halogenated hydrocarbons.

Whereas largely isotactic crystalline polypropylene has a density of from 0.900 to 0.910 g/cc, amorphous polypropylene has a density below 0.900 g/cc, usually within a range 0.82 to 0.88 g/cc.

Amorphous polypropylene is generally obtained as a byproduct in the production of crystalline isotactic polypropylene. Whereas crystalline isotactic polypropylene is not soluble except at high temperatures (above about 120° C.) in any organic solvents, the amorphous polypropylene will dissolve.

Amorphous polypropylene is usually obtained by extracting the mixture of crystalline isotactic polypropylene and amorphous polypropylene produced by typical polymerization catalysts with an appropriate solvent. The amorphous polypropylene is that fraction which is soluble in the extraction solvent.

Low viscosity is one characterizing property of conventional amorphous polypropylene obtained by extraction from crystalline polypropylene. Viscosity ranges for several grades are summarized in Table A.

Table A

| | | Amorphous Polypropylene or Propylene-Ethylene Copolymer Properties | | | | | | |
|---|---|---|---|---|---|---|---|---|
| Trademark | Density g/cc | Ring & Ball Softening Point °F. | Brookfield Viscosity 375° F. cps | Intrinsic Viscosity dl/g | Relative Viscosity | GPC, Polystyrene equivalent peaks, mol. wt. | Number average mol. wt. | Weight average mol. wt. |
| A-Fax 500 | 0.863 | 305 | 500–10,000 | 0.3–0.7 | 1.03–1.07 | ca 500 & ca 18,000 | — | — |
| A-Fax 600 | 0.863 | 205–220 | 50–100 | 0.17 | 1.017 | 500 | — | — |
| A-Fax 700 (propylene-ethylene copolymer resin) | 0.84 | 305 | 310,000 | 0.84 | — | 2940 & 152,000 | 2,470 | 164,000 |
| A-Fax 800 | 0.84 | — | 50 | 0.15 | — | 5540 & 190 | 2,010 | 10,300 |
| A-Fax 900A | 0.86 | 310 | 1,650 | 0.39 | — | 5870 | 3,460 | 43,200 |
| A-Fax 900B | 0.86 | 310 | 3,565 | 0.42 | — | — | — | — |
| A-Fax 900D | 0.86 | 310 | 5,450 | 0.51 | — | — | — | — |

Because of the lack of crystallinity, the softening points as measured by ring and ball are much lower than expected for crystalline isotactic polypropylene. Crystalline isotactic polypropylene has a melting point in the range of about 165°–189° C. Commercially available isotactic polypropylene generally shows a melting transition by differential thermal analysis (DTA) somewhat lower, usually in the range of about 155°–165° C.

The non-elastomeric, amorphous copolymer of propylene and ethylene or the like suitable for use in this invention differs from the rubbery copolymers of alpha-olefins, typically propylene and ethylene, in the very low viscosity. Whereas the EPM and EPDM have high viscosity, typically measured on a Mooney viscometer, the amorphous non-elastomeric copolymers employed as Component B herein have viscosity ranges too low to be measured by a Mooney viscometer as a practical matter. Ordinarily the viscosity of amorphous non-rubbery ethylene-propylene copolymer at 375° F. in a Brookfield Thermosel will be less than 500,000 cps, and typically is in the range 300,000–350,000 cps. A typical copolymer rubber EPM or EPDM in contrast would have a Brookfield viscosity at 375° F., one or more order of magnitude higher than 500,000.

Typical conventional amorphous polypropylene is a solid low molecular weight polymer of propylene (number average molecular weight of 500–35,000 preferably 1,000–10,000), soluble in lower hydrocarbons such as pentane or xylene, and usually having less than 5% by weight crystalline component. For the purposes of this invention, amorphous polypropylene made by any of the known processes may be used. Preferably, it is the propylene soluble constituent of the total polymer prepared from propylene monomer using a catalyst comprising a titanium halide and alkyl aluminum as disclosed in Scoggin, U.S. Pat. No. 3,280,090 and Moon, U.S. Pat. No. 3,257,372, the disclosures of which are hereby incorporated by reference. It can be made also using a metal oxide type catalyst such as chromic oxide on alumina.

An examplary conventional amorphous polypropylene is the hot methanol extraction product of a waste stream of impure amorphous polypropylene recovered from a propylene polymerization process employing a titanium halide/alkyl aluminum catalyst. The methanol extraction is described in U.S. Pat. No. 3,661,884, the disclosure of which is hereby incorporated by reference. Properties are as follows:

| Weight Average - Molecular Wt. | about 4,000 |
| Ring & Ball Softening Point | 187° F. |
| Melt Viscosity at 200° F. | 890 |
| Melt Viscosity at 275° F. | 125 |
| Melt Viscosity at 375° F. | 35 |

A remarkable feature of the present invention is the effect of amorphous polypropylene or amorphous ethylene-alpha-olefin non-elastomeric copolymer on the blend of crystalline alpha-olefin resin with alpha-olefin copolymer rubber. The chemical structure of the repeating units of amorphous polypropylene is identical with the repeating units of crystalline polypropylene, the difference being the tacticity. The chemical structure is not identical with that of the alpha-olefin copolymer rubber, which unlike the amorphous polypropylene contains two or more alpha-olefin repeating units. It is thus surprising that the physical characteristics of the blend indicate that all the amorphous polypropylene blends only with the alpha-olefin rubber phase of the blend, and none with the crystalline alpha-olefin resin. Thus, modulus and tensile of the blend, measured at room temperature depend only upon the percentage composition of crystalline alpha-olefin, and does not depend upon the relative percentage composition of alpha-olefin and amorphous polypropylene. If amorphous polypropylene, being much softer than crystalline polypropylene, had mixed with crystalline polypropylene the hardness of the blend would be expected to decrease. The hardness, measured in Shore A or Shore D units is not, however, decreased.

The remarkable utility of the blends of the invention will be manifest from the physical properties of representative blends as illustrated by the examples below. Replacing a portion of the alpha-olefin copolymer rubber A by amorphous polypropylene B in effect extends the rubber, while substantially maintaining good tensile strength and modulus, with generally no adverse effect upon hardness, and with generally increased elongation. In the conventional thermoplastic elastomeric blends based on monolefin copolymer rubber A and crystalline polyolefin resin C, the use of other extenders such as hydrocarbon oil as a partical replacement of the alpha-olefin copolymer rubber unfortunately decreases the hardness and leads to tensiles substantially lower than the mixes without such extenders. In contrast, such hydrocarbon oils can be used advantageously in blends of this invention. It is a remarkable feature of the present invention that incorporation of oil into a blend in which a portion of alpha-olefin copolymer rubber A has been replaced by amorphous polypropylene B does not lead to a decrease in hardness nor loss of tensile strength of the magnitude such oil produces in a comparable blend containing only alpha-olefin copolymer rubber in addition to crystalline polypropylene.

Blends of this invention containing amorphous polypropylene are generally somewhat harder than comparable blends containing alpha-olefin copolymer rubber with levels of crystalline polypropylene and oil equivalent to the blend containing a portion of amorphous polypropylene in place of an equivalent portion of alpha-olefin copolymer rubber. By adjusting proportionate amounts of amorphous polypropylene, alpha-olefin copolymer rubber, and oil with a fixed amount of crystalline polypropylene, blends can be prepared which are equivalent in hardness to a blend containing the fixed amount of crystalline polypropylene, alpha-olefin copolymer rubber, and oil, but said blend can be made to contain a much higher proportion of oil plus amorphous polypropylene.

Greatly improved flow characteristics are exhibited by the composition of the present invention over comparable blends not containing amorphous polypropylene. This improved flow is characterized by greatly decreased capillary viscosity measured by a McKelvey rheometer at suitable temperature. The decreased viscosity makes fabrication of injection-molded objects much faster and easier, both by improving flow into a mold, and by decreasing the pressure needed to fill the mold with the thermoplastic elastomer.

Usually the following procedure is applied in carrying out the invention:

(1) The monoolefin copolymer elastomer, the polyalpha-olefin plastic, the amorphous polypropylene or amorphous propylene alpha-olefin compolymer, and if so desired, the curing agent and/or filler, are charged at the desired ratio to a suitable mixer such as Banbury internal mixer, transfer-type extruder-mixer, extruder, or any such device that will enable efficient mastication at the desired temperature. Such blending apparatus may be preheated to reduce the time required to reach a processing temperature range, provided that such preheating temperature is below the decomposition temperature of the curing agent used.

(2) While mixing, the temperature is increased to above the decomposition temperature of the curing agent, if used, and usually the mix is held at such a temperature, while continuing the mixing, for a time period long enough to ensure at least 95% decomposition of the curing agent, based on its theoretical half life at said temperature, and thorough mixing of the blend. If no curing agent is used, the mix is simply worked at a temperature sufficiently elevated to soften the ingredients and mix them intimately.

(3) After having processed the blend to a degree described under (2), an antioxidant is ordinarily added to the blend and processing is continued usually for one minute or more in order to thoroughly incorporate the antioxidant in the blend for the purpose of deactivating any residual curing agent and enhancing protection against oxidative degradation of the composition.

(4) If so desired the resultant product may be refined on a mill before being used to form shaped articles by means of extrusion, injection molding, press molding or any suitable means of manufacture.

If a dynamic semi-curing step is carried out, suitable curing agents and curing conditions are as described in Fischer U.S. Pat. No. 3,806,558 (including col. 3, line 21 to col 4, line 24 and col 5, line 25 to col 6, line 51), the disclosure of which is hereby incorporated herein by reference. Briefly, such curatives include any conventional curing or vulcanizing agents effective in the monoolefin copolymer rubber A, especially peroxides, with or without sulfur or other co-curing agents or activators. It will be understood that the thus dynamically semi-cured blend remains a thermoplastic materal that can be reprocessed repeatedly, but it has elastomeric properties without requiring further cure. Without desiring to be limited to any particular theory of operation, it appears that the shearing imparted during the dynamic cure (cure while masticating or working) may break down a certain amount of the cross-linkages, so that the material remains thermoplastic in spite of the curing reaction. For this purpose any conventional curative or radiation may generally be employed. Examples of conventional curatives include such free-radical generating agents or cross-linking agents as the peroxides, whether aromatic or aliphatic as in the aromatic diacyl peroxides and aliphatic diacyl peroxides, dibasic acid peroxides, ketone peroxides, alkyl peroxyesters, alkyl hydroperoxides, e.g., diacetylperoxide, dibenzoylperoxide, bis-2,4-dichlorobenzoylperoxide, di-tert-butylperoxide, dicumylperoxide, tert-butylperbenzoate, tert-butylcumylperoxide, 2,5-bis(tert-butylperoxy)2,5-dimethylhexane, 2,5-bis-(tert-butylperoxy)-2,5-dimethylhexyne-3; 4,4,4',4'-tetra-(tert-butylperoxy)-2,2-dicyclohexylpropane, 1,4-bis-(tert-butylperoxyisopropyl)-benzene, 1,1-bis-(tert-butylperoxy) 3,3,5-trimethylcyclohexane, lauroyl peroxide, succinic acid peroxide, cyclohexanone peroxide, tert-butyl peracetate, butyl hydroperoxide, etc. Also suitable are the azide types of curing agents including such materials as the azidoformates (e.g., tetramethylenebis (azidofomrate); for others see U.S. Pat. No. 3,284,421, Breslow, Nov. 8, 1966), aromatic polyazides (e.g., 4,4'-diphenylmethan diazide; for others see U.S. Pat. No. 3,297,674, Breslow et al., Jan. 10, 1967), and sulfonazides such as p,p'-oxybis(benzene sulfonyl azide), etc. Other curatives that may be used include the aldehydeamine reaction products such as formaldehyde-ammonia formaldehyde-ethylchloride-ammonia, acetaldehyde-ammonia, formaldehyde-aniline, butyraldehyde-aniline, heptaldehydeaniline, heptaldehyde-formaldehyde-aniline, hexamethylenetetramine, alpha-ethyl-beta-propyl-acrolein-aniline; the substituted ureas (e.g., trimethylthiourea, diethylthiourea, dibutylthiourea, tripentylthiourea, 1,3-bis (2-benzothiazolylmercaptomethyl) urea, and N,N-diphenylthiourea); guanidines (e.g., diphenylguanidine, di-o-tolylguanidine, diphenylguanidine phthalate, and di-o-tolylguanidine salt of dicatechol borate); xanthates (e.g. zinc ethylxanthate, sodium isopropylxanthate, butylxanthic disulfide, potassium isopropylxanthate, and zinc butylxanthate; dithiocarbamates (e.g., copper dimethyl-, zinc dimethyl-, tollurium diethyl-, cadmium dicyclohexyl-, lead dimethyl-, selenium dibutyl-, zinc pentamethylene-, zinc didecyl-, and zinc isopropyloctyl-, dithiocarbamate); thiazoles (e.g., 2-mercaptobenzothiazole; zinc mercaptothiazolyl mercaptide, 2-benzothiazolyl-N,N-diethylthiocarbamyl sulfide, and 2,2'-dithiobis(benzothiazole); imidazoles (e.g., 2-mercaptoimidazoline and 2-mercapto-4,4,6-trimethyldihydropyrimidine); sulfenamides (e.g., N-t-butyl-2-benzothiazole-, N-cyclohexylbenzothiazole-, N,N-di-isopropylbenzothiazole-, N-(2,6-dimethylmorpholino)-2-benzothiazole-, and N,N-diethylbenzothiazole-sulfenamide); thiuramdisulfides (e.g., N,N'-diethyl-, tetrabutyl-, N,N'-di-isopropyldioethyl-, tetramethyl-, N,N'-dicyclohexyl-, and N,N'-tetralaurylthiuramdisulfide); also paraquinone-dioxime, dibenzoparaquinonedioxime, etc. as well as sulfur itself (see Encyclopedia of Chemical Technology, Vol. 17, 2nd edition, Interscience Publishers, 1968; also Organic Peroxides, Daniel Severn, Vol. 1, Wiley-Interscience, 1970). The peroxide curative may be used alone, or in conjunction with the usual auxiliary substances such as sulfur, maleimides including bis-maleimides, poly-unsaturated compounds (e.g., cyanurate), acrylic esters (e.g., trimethylolpropane-trimethacrylate), etc. With sulfur curatives, such as sulfur itself or sulfur donors, it is usually desirable to include an accelerator of sulfur vulcanization as well as an activator (e.g., a metal salt or oxide), as in conventional practice. Mixed peroxide-type or mixed sulfur-type curing systems may be employed if desired such as dicumylperoxide plus 2,5-bis(tert-butylperoxy)-2,5-dimethylhexane or sulfur plus tetramethylthiuramdisulfide. The preferred monnolefin copolymers having residual unsaturation, conferred by the presence of a polyene, such as EPDM, afford the widest choice of curatives. Reference may be had to "Vulcanization and Vulcanizing Agents," W. Hoffman, Palmerton Publishing Co., New York, 1967, for an extensive disclosure of curing agents. The time and temperature required for cure are in accordance with known practice, and will depend mainly in the particular curative selected as well as other details of the formulation, as is well understood by those skilled in the art. The curative is believed to affect mainly the monoolefin copolymer rubber component A, but, depending on the particular curative, there may be some cross-linking effect on the resinous components B and/or C as well. In any case the treatment may be regarded as a semi-cure or partial cure, to the extent that the product remains processable and thermoplastic, probably because of breaking down of cross-links by the masticating action while the dynamic cure is in progress. Thus, the blend does not become cross-linked to the extent that it will no longer knit together into a coherent mass in conventional rubber or plastic processing machinery.

Any conventional extender oil may be employed in the composition of the invention. Non-limiting examples are extender and process oils, whether derived from petroleum, obtained from other natural sources or manufactured synthtically, examples of extender and process oils being paraffinic oils and naphthenic oils. Further description of conventional extender oils in softeners will be found in Whitby, "Synthetic Rubber," Wiley & Sons, New York, 1954, page 383 wherein they are classified into solvents (aromatic hydrocarbons, chlorinated hydrocarbons, aliphatic hydrocarbons, and terpenes and related compounds such as gum turpentine and resin), partial solvents (esters, high-molecular weight ketones, and naphthalenes), and non-solvents (alcohols, phenols, low-molecular weight ketones, branched-chain aliphatic hydrocarbons, amines, and other alcohols). Important extender oils include the paraffinic, naphthenic and aromatic type substantially non-volatile compatible mineral oils described in U.S. Pat. No. 3,438,920, Halper et al, Apr. 15, 1969, especially col. 2, lines 38-48 and the table at cols. 3 and 4, lines 7-40, the disclosure of which is hereby incorporated herein by reference; see also U.S. Pat. No. 2,964,083, Pfau et al, Dec. 13, 1960.

The composition may further include other conventional compounding ingredients such as particulate or fibrous fillers (non-limiting examples are calcium carbonate, carbon black, silica, glass, asbestos, clay, talc), pigments, processing aids or lubricants, mold release agents, u.v. screening agents, antioxidants or stabilizers for the rubber or resin or both, etc. Any conventional antioxidant or stabilizer may be used, including, by way of non-limiting example, amine types, phenolic types, sulfides, phenyl alkanes, phosphites, etc. Representative materials are listed in "Rubber: Natural and Synthetic," Stern, Palmerton Publishing Co., New York, 1967, especially at pages 244-256; see also "Chemistry and Technology of Rubber," Davis & Blake, Reinhold, New York, 1937, Chapter XII. Included are such materials as 2,2,4-trimethyl-1,2-dihydroquinoline, diphenylamine acetone condensate, aldol-alpha-naphthylamine, octylated diphenylamine, N-phenyl-N'-cyclohexyl-p-phenylenediamine, 2,6-di-tert-butyl-4-methylphenol, styrene-resorcinol resin, o-cresol-monosulfide, di-p-cresol-2-propane, 2,5-di-tert-amyl-hydroquinone, dilauryl-3,3'-thiodipropionate and similar dialkyl thiodipropionates, etc.

The form of the invention involving a dynamic semi-curing step is particularly advantageous from the standpoint of providing better melt flow, improved high temperature physicals and better die swell. A preferred elastomer for use in the invention is the low unsaturation type of EPDM terpolymer, containing such non-conjugated dienes as 1,4-hexadiene, dicyclopentadiene or 5-ethylidene-2-norbornene. Preferred curatives for these are the peroxide, sulfur or azide types described above.

The following examples, in which all quantities are expressed by weight unless otherwise indicated, will serve to illustrate the practice of the invention in more detail.

EXAMPLE 1

This example illustrates uncured thermoplastic elastomers of the invention. Table I shows a series of blends, identified by the letters A through AAA, containing the ingredients shown in the table, expressed in parts by weight mixed following the general procedure described above. The ingredients are identified as follows:

EPDM is an unsaturated sulfur-vulcanizable elastomeric terpolymer of ethylene, propylene and dicyclopentadiene, in which the ethylene: propylene weight ratio is 53: 47; iodine number 10; Mooney viscosity 90 (ML-4 at 212° F.).

EPM is a saturated elastomeric copolymer of ethylene and propylene; ethylene: propylene weight ratio 45: 55; Mooney viscosity 66 (ML-4 at 212° F.).

Cryst PP 1 is a largely crystalline isotactic polypropylene resin commercially available as Profax (trademark) 6253 having a melt flow index of 4 at 230° C. (ASTM D 123-587) and a density of 0.903 g/cc.

Cryst PP 2 is a largely crystalline isotactic polypropylene resin, Profax 6323, having a melt flow index of 11 at 230° C. and a density of 0.903 g/cc.

Amor PP 1 is an essentially amorphous polypropylene commercially available as A-Fax (trademark) 500, described in Table A above.

Amor PP2 is an essentially amorphous polypropylene A-Fax 600, described in Table A above.

Amor P(PE) Co is an essentially amorphous propylene-ethylene copolymer A-Fax 700 containing from 15 to 25% by weight of ethylene described in Table A above.

Amor PP3 is an essentially amorphous polypropylene, A-Fax 800, described in Table A above.

Amor PP4 is an essentially amorphous polypropylene, A-Fax 900-A, described in Table A above.

Amor PP5 is an essentially amorphous polypropylene, A-Fax 900-D, described in Table A above.

The filler is magnesium silicate maximum particle size 6 microns, commercially available as Mistron Vapor (trademark).

Oil 1, a petroleum hydrocarbon extender oil, is a mixed paraffinic and naphthenic processing oil, Tufflo (trademark) 6056, liquid viscosity (100° F.) 505 SUS; specific gravity (60° F.) 0.8762; flash point 450° F., molecular weight 550.

Oil 2 is a petroleum hydrocarbon extender oil, Sun Par 150, a paraffinic oil containing 16.3% aromatic; liquid viscosity (100° F.) 515 SUS; specific gravity (60° F.) 0.880; molecular weight 505.

Mixes A through QQ further contain 1.5 parts of conventional antioxidant as described above (e.g., diphenylamine acetone condensate); the remaining mixes RR through AAA contain 1.25 parts of the antioxidant.

A Banbury mixer is charged at 0-80 psi steam, with the EPDM or EPM, crystalline polypropylene, amorphous polypropylene, filler if used and antioxidants.

If used, the oil, a portion or all, is usually added last. Two or more of the components may be pre-mixed as a masterbatch before adding to the Banbury. Temperature is raised sufficiently to melt the crystalline polypropylene, usually to a temperature of 350° F. or above, mixed for at least one minute at the elevated temperature, and dropped. The hot mix is usually sheeted out to convenient thickness on a mill, heated to about 240°-320° F.

The mill sheet is granulated to convenient size for injection molding. Test specimens are typically prepared in screw injection molding machine.

TABLE I

| | A | B | C | D | E | F | G | H | I | J | K | L | M | N | O | P | Q | R |
|---|---|---|---|---|---|---|---|---|---|---|---|---|---|---|---|---|---|---|
| EPDM | 35 | 30 | 25 | 25 | 30 | 25 | 50 | 40 | 45 | 40 | 40 | 40 | | | 60 | 50 | 40 | |
| EPM | | | | | | | | | | | | | 50 | 50 | | | | 60 |
| Cryst. PP1 | 65 | 65 | 65 | 65 | 65 | 65 | 50 | 50 | 50 | 50 | 50 | 50 | 40 | 40 | 40 | 40 | 40 | 40 |
| Cryst. PP2 | | | | | | | | | | | | | | | | | | |
| Amor. PP1 | | 5 | 10 | 10 | | | | 10 | 10 | | | 10 | 10 | | | 10 | 20 | |
| Amor. PP2 | | | | | 5 | 10 | | | | 10 | 10 | | | 10 | | | | |
| Amor. P(PE)Co | | | | | | | | | | | | | | | | | | |
| Amor. PP3 | | | | | | | | | | | | | | | | | | |
| Amor. PP4 | | | | | | | | | | | | | | | | | | |
| Amor. PP5 | | | | | | | | | | | | | | | | | | |
| Filler | | | | 10 | | | | | 10 | | 10 | | | | | | | |

TABLE I-continued

| | | | | | | | | | | | | | | | | | | |
|---|---|---|---|---|---|---|---|---|---|---|---|---|---|---|---|---|---|---|
| Oil 1 | | | | | | | | | | | 10 | | | | | | | |
| Oil 2 | | | | | | | | | | | | | | | | | | |
| Antioxidant | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Hardness, Shore A | | | | | | | | | | | | | | | 91 | 94 | 93 | 91 |
| Hardness, Shore D | 52 | 50 | 52 | 52 | 52 | 53 | 44 | 45 | 45 | 51 | 50 | 45 | 33 | 34 | | | | |

ROOM TEMPERATURE

| | | | | | | | | | | | | | | | | | | |
|---|---|---|---|---|---|---|---|---|---|---|---|---|---|---|---|---|---|---|
| 100% Modulus, psig. | 2276 | 2176 | 2275 | 2442 | 2472 | 2488 | 1867 | 1885 | 1890 | 1914 | 1896 | 1889 | 1337 | 1331 | 1469 | 1523 | 1568 | 1338 |
| 300% Modulus, psig. | 2138 | 2181 | 2260 | 2267 | 2274 | 2271 | 1737 | 1798 | 1780 | — | — | 1777 | 1315 | — | — | — | 1439 | — |
| Tensile, psig. | 2318 | 2299 | 2392 | 2415 | 2425 | 2462 | 1829 | 1863 | 1863 | 1870 | 1862 | 1893 | 1401 | 1347 | 1480 | 1537 | 1565 | 1373 |
| Ultimate Elongation, % | 310 | 260 | 267 | 213 | 345 | 350 | 250 | 252 | 230 | 192 | 212 | 240 | 297 | 282 | 155 | 160 | 265 | 210 |
| Permanent Set, % | | | | | | | 150 | 182 | 145 | 120 | 127 | 192 | 185 | 157 | 60 | 67 | 159 | 104 |

250° F.

| | | | | | | | | | | | | | | | | | | |
|---|---|---|---|---|---|---|---|---|---|---|---|---|---|---|---|---|---|---|
| 100% Modulus, psig. | 744 | 472 | 614 | 644 | 705 | 518 | 474 | 438 | 422 | 469 | 491 | 519 | 308 | 283 | 384 | 392 | 350 | 333 |
| 300% Modulus, psig. | 796 | 501 | 633 | 654 | 699 | 556 | 518 | 449 | 428 | 455 | 465 | 500 | — | — | 348 | 305 | 378 | 321 |
| Tensile, psig. | 1011 | 862 | 1058 | 996 | 1026 | 996 | 648 | 631 | 581 | 624 | 602 | 649 | 337 | 306 | 519 | 510 | 498 | 484 |
| Ultimate Elongation, % | 1007 | 1366 | 1380 | 1407 | 1250 | 1563 | 893 | 1283 | 1440 | 1393 | 903 | 1133 | 1022 | 1000 | 637 | 667 | 880 | 760 |
| Compression Set, 22 Hrs. R.T. | | | | | | | | | | | | | | | | | | |

| | S | T | U | V | W | X | Y | Z | AA | BB | CC | DD | EE | FF | GG | HH | II | JJ |
|---|---|---|---|---|---|---|---|---|---|---|---|---|---|---|---|---|---|---|
| EPDM | | 50 | 40 | 30 | | | | 70 | 60 | 45 | 60 | 45 | 50 | 40 | 40 | 00 | 40 | |
| EPM | 50 | 40 | | | 50 | 40 | 30 | | | | | | | | | | | |
| Cryst. PP1 | 40 | 40 | 40 | 40 | 40 | 40 | 40 | 40 | 30 | 30 | 30 | 30 | 30 | 50 | 50 | 50 | 50 | 50 |
| Cryst. PP2 | | | | | | | | | | | | | | | | | | |
| Amor. PP1 | 10 | 20 | | | | | | | | 10 | 25 | | | 10 | | | | |
| Amor. PP2 | | | 10 | 20 | 30 | 10 | 20 | 30 | | | | 10 | 25 | | 10 | | | |
| Amor. P(PE)Co | | | | | | | | | | | | | | | | | 10 | |
| Amor. PP3 | | | | | | | | | | | | | | | | | | |
| Amor. PP4 | | | | | | | | | | | | | | | | | | 10 |
| Amor. PP5 | | | | | | | | | | | | | | | | | | |
| Filler | | | | | | | | | | | | | | | | | | |
| Oil 1 | | | | | | | | | | | | | | | | | | |
| Oil 2 | | | | | | | | | | | | | | | | | | |
| Antioxidant | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Hardness, Shore A | 90 | 91 | 94 | 92 | 92 | 93 | 92 | — | 84 | 89 | 88 | 87 | 88 | 95 | 95 | 95 | 96 | 96 |
| Hardness, Shore D | | | | | | | | | | | | | | | | | | |

ROOM TEMPERATURE

| | | | | | | | | | | | | | | | | | | |
|---|---|---|---|---|---|---|---|---|---|---|---|---|---|---|---|---|---|---|
| 100% Modulus, psig. | 1455 | 1418 | 1565 | 1513 | 1427 | 1407 | 1366 | 1331 | 1080 | 1152 | 1107 | 1119 | 1090 | 2057 | 1991 | 1956 | 1998 | 2094 |
| 300% Modulus, psig. | — | 1435 | 1443 | 1394 | 1389 | 1336 | 1395 | 1339 | — | 1077 | 1044 | — | 1039 | — | — | — | — | — |
| Tensile, psig. | 1468 | 1456 | 1570 | 1511 | 1442 | 1461 | 1408 | 1387 | 1107 | 1176 | 1132 | 1150 | 1111 | 1939 | 1961 | 1919 | 1956 | 2043 |
| Ultimate Elongation, % | 222 | 327 | 252 | 275 | 340 | 297 | 320 | 395 | 147 | 227 | 282 | 210 | 245 | 197 | 177 | 210 | 197 | 170 |
| Permanent Set, % | 120 | 219 | 149 | 172 | 222 | 192 | 205 | 275 | 50 | 95 | 146 | — | 122 | 95 | 92 | 120 | 120 | 92 |

250° F.

| | | | | | | | | | | | | | | | | | | |
|---|---|---|---|---|---|---|---|---|---|---|---|---|---|---|---|---|---|---|
| 100% Modulus, psig. | 386 | 317 | 371 | 328 | 287 | 350 | 291 | 297 | 267 | 288 | 208 | 243 | 204 | 509 | 453 | 462 | 486 | 445 |
| 300% Modulus, psig. | 480 | 339 | 403 | 346 | 313 | 393 | 317 | 314 | 253 | 266 | 232 | 219 | 232 | 471 | 435 | 484 | 446 | 462 |
| Tensile, psig. | 493 | 477 | 510 | 478 | 411 | 553 | 448 | 506 | 289 | 332 | 305 | 305 | 293 | 491 | 498 | 527 | 520 | 654 |
| Ultimate Elongation, % | 880 | 1072 | 740 | 910 | 1030 | 952 | 1100 | 1155 | 295 | 462 | 785 | 522 | 747 | 837 | 952 | 742 | 1057 | 1057 |
| Compression Set, 22 Hrs. R.T. | | | | | | | | | | | | | | 79.5 | 80.9 | 68.9 | 79.3 | 75.8 |

| | KK | LL | MM | NN | OO | PP | QQ | RR | SS | TT | UU | VV | WW | XX | YY | ZZ | AAA |
|---|---|---|---|---|---|---|---|---|---|---|---|---|---|---|---|---|---|
| EPDM | 40 | 40 | 40 | 40 | 40 | 40 | 40 | 45 | 40 | 35 | 30 | 40 | 49 | 52.5 | 41 | 60 | 37.5 |
| EPM | | | | | | | | | | | | | | | | | |
| Cryst. PP1 | 50 | 50 | 50 | 50 | 50 | 50 | 50 | 40 | 40 | 40 | 40 | — | 35 | 30 | 45 | — | 50 |
| Cryst. PP2 | | | | | | | | | | | | 40 | | | | 40 | |
| Amor. PP1 | | | 10 | | | | | 15 | 20 | 25 | 30 | 20 | 16 | 17.5 | 14 | | 12.5 |
| Amor. PP2 | | | | 10 | | | | | | | | | | | | | |
| Amor. P(PE)Co | | | | | 10 | | | | | | | | | | | | |
| Amor. PP3 | | 10 | | | | 10 | | | | | | | | | | | |
| Amor. PP4 | | | | | | | 10 | | | | | | | | | | |
| Amor. PP5 | 10 | | | | | | | | | | | | | | | | |
| Filler | | | | | | | | | | | | | | | | | |
| Oil 1 | | | | | | | | | | | | | | | | | |

TABLE I-continued

| | | | | | | | | | | | | | | | | | |
|---|---|---|---|---|---|---|---|---|---|---|---|---|---|---|---|---|---|
| Oil 2 | | | 10 | 10 | 10 | 10 | 10 | | | | | | | | | | |
| Antioxidant | 1.5 | 1.5 | 1.5 | 1.5 | 1.5 | 1.5 | 1.5 | 1.25 | 1.25 | 1.25 | 1.25 | 1.25 | 1.25 | 1.25 | 1.25 | 1.25 | 1.25 |
| Hardness, Shore A | 96 | 96 | 96 | 95 | 94 | 96 | 96 | 95 | 95 | 96 | 96 | 94 | 95 | 93 | 94 | 94 | 96 |
| Hardness, Shore D | | | | | | | | 33 | 36 | 37 | 38 | 40 | 38 | 35 | 44 | 36 | 48 |
| ROOM TEMPERATURE | | | | | | | | | | | | | | | | | |
| 100% Modulus, psig. | 1996 | 1965 | 1784 | 1756 | 1681 | 1675 | 1789 | 1447 | 1419 | 1379 | 1355 | 1284 | 1190 | 1013 | 1611 | 1309 | 1808 |
| 300% Modulus, psig. | — | — | — | 1756 | — | 1562 | 1600 | 1353 | 1321 | 1259 | 1302 | 1194 | 1189 | 1033 | 1486 | 1269 | 1638 |
| Tensile, psig. | 2048 | 1941 | 1786 | 1797 | 1640 | 1698 | 1800 | 1458 | 1432 | 1382 | 1371 | 1270 | 1233 | 1077 | 1611 | 1337 | 1824 |
| Ultimate Elongation, % | 182 | 197 | 270 | 270 | 277 | 290 | 245 | 279 | 320 | 305 | 228 | 228 | 291 | 300 | 310 | 220 | 293 |
| Permanent Set, % | 90 | 115 | 160 | 150 | 175 | 140 | 140 | 170 | 165 | 150 | 155 | 150 | 140 | 130 | 175 | 100 | 230 |
| 250° F. | | | | | | | | | | | | | | | | | |
| 100% Modulus, psig. | 450 | 456 | 366 | 274 | 338 | 401 | 351 | | | | | | | | | | |
| 300% Modulus, psig. | 483 | 473 | 400 | 300 | 364 | 415 | 366 | | | | | | | | | | |
| Tensile, psig. | 560 | 529 | 501 | 480 | 454 | 479 | 393 | | | | | | | | | | |
| Ultimate Elongation, % | 1035 | 880 | 1015 | 932 | 920 | 857 | 1200 | | | | | | | | | | |
| Compression Set, 22 Hrs. R.T. | 75.5 | 78.6 | 82.1 | 83.2 | 83.8 | 83.5 | 79.2 | | | | | | | | | | |

EXAMPLE 2

In this example, two cured Base Polymer mixtures are first prepared identified as Base Polymer I and II in Table II, both of which contain EPDM and crystalline polypropylene (Cryst PP 1) as identified in Example 1; one of these Base Polymers contains amorphous polypropylene (Amor PP 1 of Example 1), while the other does not. The curing agent is 2,5-bis(tertiarybutylperoxy)-2,5-dimethylhexane (Varox; trademark).

Table II shows the amounts of each ingredient, in parts by weight.

The procedure involves preparing cured blends A and B in a Banbury by charging first the EPDM, crystalline polypropylene, and amorphous polypropylene if used. The curing agent is added, and the temperature is raised to 350° F. or higher. After 2 minutes at 350° F. or higher the antioxidant is added and mixed, to destroy residual traces of curing agent. The mix is dropped and sheeted on a mill. The sheeted mix is cut into convenient size pieces. These weighed pieces are loaded into a Banbury, along with the other ingredients, of blends C, D, E, F, G, H. The temperature of the Banbury is raised to 350° F. or higher allowing at least two minutes of mixing at elevated temperature. The charge is dropped, sheeted on a mill and granulated. Test pieces are prepared in a screw injection molding machine.

Base Polymer I is outside the invention; Base Polymer II is within the invention.

Table III shows the physical properties of injection molded specimens of each of the two Base Polymers, as well as a series of mixes made by adding additional ingredients in the amounts shown in Table III, wherein Cryst PP 1 is again the crystalline polypropylene used in Example 1, Amor PP 1 is again the amorphous polypropylene used in Example 1, and Oil 1 is extender oil as identified in Example 1.

Final blend A, C and E are outside the invention. It will be observed from the Table III data that good tensile strength is maintained while elongation and flow properties are improved.

TABLE II

| | Cured Base Polymers | |
|---|---|---|
| | I | II |
| EPDM | 80 | 60 |
| Crystalline PP1 | 20 | 20 |
| Amorphous PP1 | — | 20 |
| Curing Agent | 0.8 | 0.8 |
| Antioxidant | 1.5 | 1.5 |

TABLE III

| | A | B | C | D | E | F | G | H |
|---|---|---|---|---|---|---|---|---|
| Base Polymer I | 100 | | 75 | | 100 | 100 | | |
| Base Polymer II | | 100 | | 75 | | | 100 | 100 |
| Cryst. PP1 | | | 25 | 25 | | | | |
| Amor. PP1 | | | | | | 10 | | 10 |
| Oil 1 | | | | | 20 | 20 | 20 | 20 |
| Hardness, Shore A | 72 | 80 | 94 | 95 | 64 | 68 | 68 | 72 |
| Hardness, Shore D | 25 | 30 | 36 | 40 | 11 | 14 | 11 | 15 |
| ROOM TEMPERATURE | | | | | | | | |
| 100% Modulus, psig. | 408 | 429 | 1440 | 1269 | 315 | 373 | 279 | 302 |
| 300% Modulus, psig. | — | 598 | 1477 | 1368 | 476 | 467 | 394 | 375 |
| Tensile, psig. | 609 | 606 | 1478 | 1403 | 460 | 479 | 424 | 408 |
| Ultimate Elongation, % | 225 | 315 | 282 | 350 | 254 | 308 | 330 | 358 |
| Set, % | 30 | 55 | 115 | 150 | 26 | 35 | 54 | 59 |
| 250° F. | | | | | | | | |
| 100% Modulus, psig. | 124 | 102 | 333 | 283 | — | — | — | — |
| 300% Modulus, psig. | — | 147 | 420 | 343 | — | — | — | — |

TABLE III-continued

|  | A | B | C | D | E | F | G | H |
|---|---|---|---|---|---|---|---|---|
| Tensile, psig. | 165 | 147 | 523 | — | — | — | — | — |
|  |  | 480 |  |  |  |  |  |  |
| Ultimate Elongation, % | 167 | 300 | 473 | 840 | — | — | — | — |
| COMPRESSION SET |  |  |  |  |  |  |  |  |
| 22 Hrs. Rm. Temp. % | 45.6 | 56.9 | — | — |  |  |  |  |
| 70 Hrs. Rm. Temp. % |  |  |  |  | 40.8 | 49.0 | 54.8 | 55.7 |
| Capillary Flow poises X $10^3$ ($410\ Sec^{-1}$ & 350° F.) | 9.5 | 4.5 | — | — | 5.8 | 4.2 | 2.9 | 1.7 |
| Flexural Modulus, psig. | — | — | 31,800 | 34,800 |  |  |  |  |

EXAMPLE 3

Five masterbatches, identified as Masterbatches I to V in Table IV, are prepared from the ingredients indicated in Table IV, using Varox peroxide curing agent, according to the procedure of Example 2.

Masterbatches II, III, IV, and V are within the invention; Masterbatch I is outside the invention.

These masterbatches are used to prepare test specimens A to J in Table V, according to the procedure of Example 2. Specimens A and F are outside the invention. Tensile strengths, which are somewhat low in cured samples compared to uncured, can be improved by addition of crystalline polypropylene after the curing step.

TABLE IV

| MASTERBATCH→ | I | II | III | IV | V |
|---|---|---|---|---|---|
| EPDM 1 | 80 | 0 | 60 | 50 | 50 |
| Cryst. PP1 | 20 | 20 | 20 | 20 | 20 |
| Amor. PP1 |  | 20 |  | 30 |  |
| Amor. PP2 |  |  | 20 |  | 30 |
| Curing Agent | 0.8 | 0.8 | 0.8 | 0.8 | 0.8 |
| Antioxidant | 1.0 | 1.0 | 1.0 | 1.0 | 1.0 |

TABLE V

| RUNS→ | A | B | C | D | E | F | G | H | I | J |
|---|---|---|---|---|---|---|---|---|---|---|
| Masterbatch I | 100 |  |  |  | 75 |  |  |  |  |  |
| Masterbatch II |  | 100 |  |  |  | 75 |  |  |  |  |
| Masterbatch III |  |  | 100 |  |  |  | 75 |  |  |  |
| Masterbatch IV |  |  |  | 100 |  |  |  | 75 | 75 |  |
| Masterbatch V |  |  |  |  | 100 |  |  |  |  | 75 |
| Cryst. PP1 |  |  |  |  |  | 25 | 25 | 25 | 25 | 25 |
| Hardness, Shore A | 78 | 82 | 82 | 86 | 84 | 94 | 94 | 94 | 95 | 94 |
| ROOM TEMPERATURE |  |  |  |  |  |  |  |  |  |  |
| 100% Modulus, psig. | 539 | 507 | 455 | 438 | 381 | 1312 | 1275 | 1230 | 1206 | 1233 |
| 300% Modulus, psig. | — | 681 | 595 | 510 | 447 | 1409 | 1313 | 1248 | 1245 | 1240 |
| Tensile, psig. | 700 | 695 | 620 | 529 | 469 | 1483 | 1468 | 1377 | 1291 | 1335 |
| Ultimate Elongation, % | 235 | 342 | 355 | 327 | 372 | 265 | 352 | 322 | 357 | 385 |
| Permanent Set, % | 29 | 70 | 65 | 72 | 90 | 107 | 177 | 166 | 196 | 213 |
| 250° |  |  |  |  |  |  |  |  |  |  |
| 100% Modulus, psig. | 151 | 111 | 97 | 71 | 61 | 334 | 310 | 342 | 213 | 316 |
| 300% Modulus, psig. | — | 144 | 139 | 77 | 70 | 395 | 355 | 367 | 212 | 340 |
| Tensile, psig. | 190 | 152 | 139 | 82 | 76 | 448 | 468 | 478 | NO BREAK | 516 |
| Ultimate Elongation, % | 197 | 317 | 350 | 455 | 500 | 540 | 750 | 805 | >1600 | 1010 |
| Compression Set, % 22 Hrs. @ 150° F. | 63.7 | 71.4 | 73.6 | 78.2 | 77.3 | 75.7 | 80.7 | 71.4 | 84.2 | 77.1 |

EXAMPLE 4

In a first stage, mixtures of EPDM rubber and crystalline polypropylene, with or without amorphous polypropylene, in the proportions indicated in Table VI are worked in a Banbury mixer with Varox peroxide curative at 350° F. for 2 minutes to effect a dynamic cure. Antioxidant is added.

Thereafter, in a second stage, an additional charge of one or more of the following are added and mixed at 350° F. for 2 minutes, in the proportions indicated in Table VI:

(1) crystalline polypropylene
(2) amorphous polypropylene
(3) oil.

Blends A and C are outside the limits of the invention.

This example demonstrates a modification of the mixing procedure of examples 2 and 3, in which masterbatches are first prepared, then remixed with additional ingredients added in a second mixing stage. In the present example, a masterbatch is prepared as before, and a second charge is loaded in on top of the first charge, after curing, and after addition of antioxidant. The second charge is mixed well before the charge is dropped, then processed as in the preceding examples 2 and 3.

The present example also demonstrates that relatively large quantities of combined amorphous polypropylene and oil can be incorporated into mixes, while maintaining satisfactory physical properties.

TABLE VI

|  | FIRST STAGE | | | | | | | |
|---|---|---|---|---|---|---|---|---|
| RUN NUMBER→ | A | B | C | D | E | F | G | H |
| EPDM | 60 | 40 | 80 | 60 | 80 | 60 | 70 | 60 |
| Crystalline PP1 | 25 | 25 | 20 | 20 | 20 | 20 | 20 | 20 |

TABLE VI-continued

| | | | | | | | | |
|---|---|---|---|---|---|---|---|---|
| Amorphous PP1 | | 20 | | 20 | | 20 | 10 | 15 |
| Curing Agent | 0.8 | 0.8 | 0.8 | 0.8 | 0.8 | 0.8 | 0.8 | 0.8 |
| Antioxidant | 1.25 | 1.25 | 1.25 | 1.25 | 1.25 | 1.25 | 1.25 | 1.25 |
| SECOND STAGE | | | | | | | | |
| Crystalline PP1 | 15 | 15 | | | | | | |
| Amorphous PP1 | | | | | 20 | 20 | 20 | 20 |
| Oil 1 | | | 20 | 20 | 10 | 10 | 10 | 20 |
| Hardness, Shore A | 93 | 95 | 67 | 74 | 72 | 78 | 76 | 72 |
| Hardness, Shore D | 34 | 36 | 14 | 16 | 16 | 18 | 18 | 15 |
| ROOM TEMPERATURE | | | | | | | | |
| 100% Modulus, psig. | 964 | 1041 | 257 | 292 | 314 | 293 | 313 | 246 |
| 300% Modulus, psig. | 1202 | 1160 | 349 | 372 | 428 | 332 | 389 | 306 |
| Tensile, psig. | 1336 | 1193 | 340 | 391 | 417 | 343 | 398 | 312 |
| Ultimate Elongation, % | 388 | 443 | 245 | 328 | 318 | 348 | 340 | 338 |
| Permanent Set, % | 149 | 220 | 25 | 55 | 40 | 75 | 55 | 55 |

I claim:

1. A thermoplastic elastomer which is a blend of:
   A. a monoolefin copolymer rubber which is a copolymer of ethylene and an alpha-monoolefin of the formula $CH_2=CHR$ where R is an alkyl radical having 1 to 12 carbon atoms, and a copolymerizable non-conjugated diene termonomer, said rubber having a Brookfield viscosity in excess of 5,000,000 cps at 375° F.;
   B. an amorphous non-elastomeric polypropylene resin having a number average molecular weight of from 500 to 35,000 or amorphous non-elastomeric resinous copolymer of propylene with another monoolefin having a Brookfield viscosity less than 500,000 cps at 375° F., said amorphous non-elastomeric resin being soluble below 100° C. in aliphatic, aromatic and halogenated hydrocarbon solvents; and
   C. a crystalline polyolefin plastic insoluble in the aforesaid solvents below 100° C.;
the said ingredients A, B and C being present in the following proportions, expressed as percent by weight based on the sum of the weights of A, B and C:
   from 15 to 80% of A,
   from 5 to 45% of B, and
   from 15 to 80% of C,
the said thermoplastic elastomer being in a dynamically partially cured state.

2. A thermoplastic elastomer as in claim 1 in which the proportions of A, B and C are:
   from 20 to 80% of A
   from 5 to 35% of B, and
   from 15 to 75% of C.

3. A thermoplastic elastomer as in claim 1 containing up to 70% by weight of oil, based on the sum of the weights of A, B and C.

4. A thermoplastic elastomer as in claim 1 in which C is crystalline polypropylene resin having a density of from 0.900 to 0.910 g/cc.

5. A thermoplastic elastomer which is a blend of:
   A. a rubbery copolymer of ethylene and propylene or terpolymer of ethylene, propylene and a non-conjugated diene, having a Brookfield viscosity in excess of 5,000,000 cps at 375° F. and a Mooney viscosity of at least 20 ML-4 at 212° F.;
   B. an amorphous non-elastomeric propylene homopolymer resin having a density of from 0.82 to 0.88 g/cc and a number average molecular weight of from 1,000 to 10,000 or amorphous non-elastomeric propylene-ethylene copolymer resin having a Brookfield viscosity less than 500,000 cps at 375° F., said amorphous non-elastomeric resin being soluble below 100° C. in aliphatic, aromatic and halogenated hydrocarbon solvents; and
   C. crystalline polypropylene resin insoluble in the aforesaid solvents below 100° C., having a density of from 0.900 to 0.910 g/cc;
the proportions of A, B and C, expressed as percent by weight based on the sum of the weights of A, B and C, being as follows:
   from 15 to 80% of A;
   from 5 to 45% of B; and
   from 15 to 80% of C,
the said thermoplastic elastomer being dynamically partially cured.

6. A thermoplastic elastomer as in claim 5 in which the proportions of A, B and C are:
   from 20 to 80% of A,
   from 5 to 35% of B, and
   from 15 to 75% of C.

7. A thermoplastic elastomer as in claim 6, dynamically partially cured with an organic peroxide curative.

8. A thermoplastic elastomer as in claim 7, in which A is an ethylene-propylene-dicyclopentadiene terpolymer.

9. A thermoplastic elastomer as in claim 8, containing 5 to 30% by weight of extender oil, based on the sum of the weights of A, B and C.

* * * * *